United States Patent
Nozaki

(10) Patent No.: US 9,411,287 B2
(45) Date of Patent: Aug. 9, 2016

(54) TECHNIQUE FOR REDUCING POWER CONSUMED BY ELECTRIC EQUIPMENT

(71) Applicant: CANON KABUSHIKI KAISHA, Tokyo (JP)

(72) Inventor: Tetsuya Nozaki, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 241 days.

(21) Appl. No.: 14/146,455

(22) Filed: Jan. 2, 2014

(65) Prior Publication Data

US 2014/0192574 A1   Jul. 10, 2014

(30) Foreign Application Priority Data

Jan. 10, 2013 (JP) ................. 2013-002839

(51) Int. Cl.
| | |
|---|---|
| *H02M 3/24* | (2006.01) |
| *H02M 5/42* | (2006.01) |
| *H02M 7/04* | (2006.01) |
| *H02M 7/68* | (2006.01) |
| *G03G 15/00* | (2006.01) |
| *H02M 1/00* | (2006.01) |

(52) U.S. Cl.
CPC ............ *G03G 15/5004* (2013.01); *G03G 15/80* (2013.01); *H02M 2001/0006* (2013.01)

(58) Field of Classification Search
CPC ... G03G 15/80; G03G 15/5004; Y02B 70/16; H02M 7/06; H02M 1/32; H02M 1/36; H02M 1/322; H02M 1/325; H02M 1/327; H02M 1/34; H02M 3/335; H02M 3/33507; H02M 3/3353; H02M 3/33561; H02M 3/33569; H02M 3/337; H02M 3/338; H02M 2001/0032; H02M 2001/0035; G06F 1/325; G06F 1/3287; G06F 1/3234; G06F 1/32; G06F 1/3203; G06F 1/3243; G06F 1/3246; G06F 1/3293; G06F 1/3296; H04N 1/00885; H04N 1/00888; H04N 1/00899

USPC ............ 363/15–21.18, 49–56.12, 77–84, 89, 363/106, 108, 109, 125–127; 323/205–211, 323/222–226, 271–276, 282–288, 351, 323/901; 399/37, 88–90; 713/300–340; 307/23, 38–41, 125; 361/90
See application file for complete search history.

(56) References Cited

U.S. PATENT DOCUMENTS 5,699,218 A * 12/1997 Kadah .................... H01H 9/542
                                                           361/13
2011/0064445 A1* 3/2011 Yashiro .............. G03G 15/5004
                                                           399/88

(Continued)

FOREIGN PATENT DOCUMENTS

JP      9-200954 A    7/1997
JP    2002-19232 A    1/2002

*Primary Examiner* — Timothy J Dole
*Assistant Examiner* — Carlos Rivera-Perez
(74) *Attorney, Agent, or Firm* — Fitzpatrick, Cella, Harper & Scinto

(57) ABSTRACT

When an image forming apparatus shifts to a power saving mode, a controller unit further reduces power consumption by switching AC current on/off every predetermined amount of time. When AC current input from a commercial AC power supply is turned off, a DC voltage generating circuit normally can no longer supply a DC voltage, rendering the controller unit unable to operate. Accordingly, the controller unit operates using a charge accumulated in a smoothing capacitor while the AC current is not being supplied. An AC cutting circuit is switched on before a both-end voltage at the smoothing capacitor drops below a lower limit of operation voltage of the DC voltage generating circuit, and the smoothing capacitor is recharged.

9 Claims, 9 Drawing Sheets

(56) References Cited

U.S. PATENT DOCUMENTS

| | | | | |
|---|---|---|---|---|
| 2012/0025630 A1* | 2/2012 | Tsuda | ............... | G03G 15/5004 307/125 |
| 2012/0212980 A1* | 8/2012 | Kato | ............... | G03G 15/5004 363/21.12 |
| 2012/0250365 A1* | 10/2012 | Matsumoto | ............. | H02M 1/36 363/21.15 |
| 2013/0257451 A1 | 10/2013 | Nozaki | | |
| 2013/0322898 A1 | 12/2013 | Koseki et al. | | |

* cited by examiner

TECHNIQUE FOR REDUCING POWER CONSUMED BY ELECTRIC EQUIPMENT

BACKGROUND OF THE INVENTION

1. Field of the Invention

The present invention relates to techniques for reducing power consumed by electric equipment.

2. Description of the Related Art

A power saving mode that stops a large-capacity power supply for supplying power to motors, driving circuits, and the like and electrifies only necessary control circuits in order to reduce standby power in electric equipment such as image forming apparatuses has been proposed in the past (Japanese Patent Laid-Open No. 9-200954, Japanese Patent Laid-Open No. 2002-19232). Japanese Patent Laid-Open No. 9-200954 proposes a power saving mode that, when in a standby state, operates only an efficient power supply for supplying power to a host device and an interface controller, and stops other power supplies. Meanwhile, Japanese Patent Laid-Open No. 2002-19232 attempts to save power by reducing the output voltage of a large-capacity power supply when in a power saving mode.

Incidentally, a line filter is inserted in a power supply line of a power supply apparatus in order to reduce noise (Japanese Patent Laid-Open No. 2002-19232). Meanwhile, it is necessary to communicate with a host device such as a PC even when in a power saving mode, and thus it is necessary to continually supply power to control circuits from a commercial AC power supply. In other words, with the conventional techniques, power loss occurs at the line filter as long as power is being supplied from the commercial AC power supply, even when using the power saving mode.

A typical line filter is configured of an X-capacitor that is an inter-line capacitor, a common mode choke coil, and a Y-capacitor that is a line bypass capacitor. High-capacity X-capacitors that exceed 1 [μF] are also used in switching-mode power supplies employed in power supply circuits of image forming apparatuses. With respect to X-capacitors, safety standards require that residual voltages between plugs drop below a regulated voltage within one second from the time the plug is removed from an outlet. To achieve this, it is necessary to insert discharge resistances for rapidly discharging the charge accumulated in the X-capacitor between two power supply lines. However, discharge resistances consume an amount of power determined by resistance values and input voltages when the power supply apparatus is connected to a commercial AC power supply. Power loss from discharge resistances makes up the primary portion of power loss caused by line filters.

For example, to set the discharge constant of an X-capacitor having a capacity of 1 [μF] to one second or less, it is necessary to set the resistance value of the discharge resistance to 1 [MΩ] or less. In other words, as the capacity of the X-capacitor is increased to combat noise, it is conversely necessary to reduce the discharge resistance. The power consumed by a 1 [MΩ] discharge resistance is calculated as follows when the AC input is 240 [V].

$$\text{Consumed power} = 240 \times 240/1000000 = 0.0576 \text{ [W]}$$

In this manner, a greater amount of power is consumed as the resistance value of the discharge resistance drops (that is, as the capacity of the X-capacitor increases).

In a power supply apparatus whose standby power is several watts, the power consumed by the discharge resistance can be ignored. However, products whose standby power is less than 1 [W] are appearing due to market-driven demands for power savings, various countries recently strengthening their standby power regulations, and so on. It is therefore becoming more and more difficult to ignore power consumed by discharge resistances.

SUMMARY OF THE INVENTION

Accordingly, the present invention proposes a further reduction in power consumed by an image forming apparatus operating in a power saving mode.

The present invention provides electric equipment having a normal power supply mode and a power saving mode that consumes less power than the normal power supply mode. The equipment may comprise the following elements. An AC cutting circuit, connected serially to a power supply line through which AC current is input, is configured to turn the supply of the AC current on and off. A rectifying and smoothing circuit is configured to rectify the AC current and smooth the AC current using a capacitor. A DC voltage generating circuit, connected to the rectifying and smoothing circuit, is configured to generate a DC voltage. A controller, operating under the DC voltage generated by the DC voltage generating circuit, is configured to cause the AC cutting circuit to turn the supply of the AC current off when the electric equipment shifts to the power saving mode, and then cause the AC cutting circuit to turn the supply of the AC current on every predetermined amount of time in order to charge the capacitor.

Further features of the present invention will become apparent from the following description of exemplary embodiments (with reference to the attached drawings).

DESCRIPTION OF THE EMBODIMENTS

Figure 1:
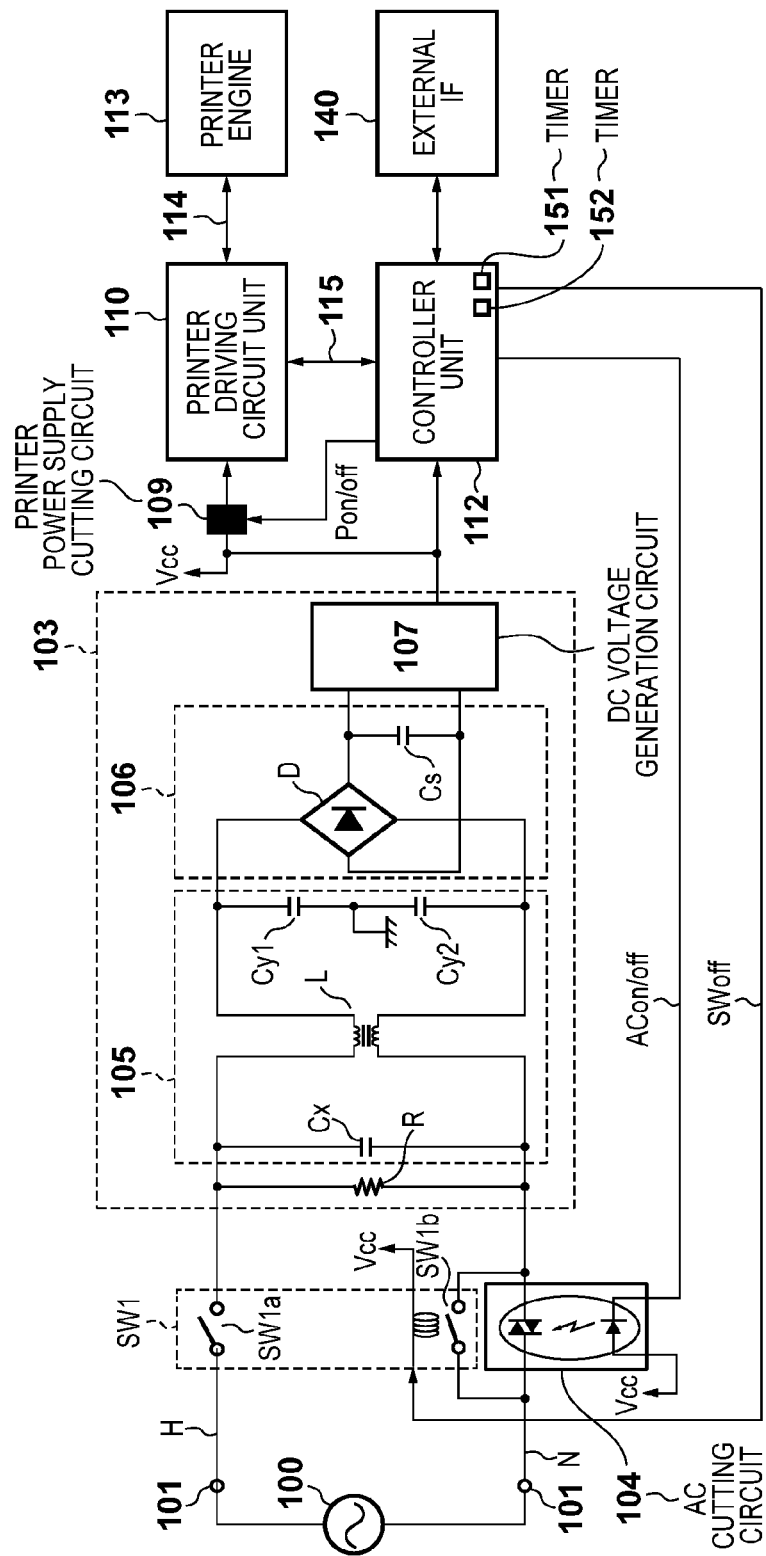
FIG. 1 is a block diagram illustrating a power supply apparatus and part of an image forming apparatus according to a first embodiment.

According to the present invention, an amount of power consumed is reduced more than in conventional techniques that continuously supply power from a commercial AC power supply by interrupting the power from the commercial AC power supply when shifting from an image forming mode to a power saving mode.

Note that a controller is driven using power accumulated in a charge accumulation device such as a capacitor when the power from the commercial AC power supply is cut. The commercial AC power supply is reconnected and the capacitor is charged before the charge in the capacitor is depleted.

First Embodiment

Blocks involved in power supply control of an image forming apparatus will first be described using FIG. 1. An AC power plug 101 of the image forming apparatus is connected to a commercial AC power supply 100. Two AC power supply lines from the AC power plug 101, namely a hot line H and a neutral line N, are connected to a DC power supply 103. A main power supply switch SW1 and an AC cutting circuit 104 are inserted between the AC power plug 101 and the DC power supply 103. The main power supply switch SW1 and the AC cutting circuit 104 can cut an AC current input from the commercial AC power supply 100. The DC power supply 103 generates a DC voltage Vcc by rectifying and smoothing the input AC voltage. The DC voltage Vcc is supplied to a controller unit 112 that controls operations of the image forming apparatus. The DC voltage Vcc is a voltage suited to integrated circuits used for control, such as 3.3 V, for example. Although not illustrated in the drawings, the DC power supply 103 may include a DC-DC converter. The DC-DC converter is a voltage converter that, for example, converts 3.3 V into 24 V, converts 24 V into 12 V, 5 V, 3.3 V, and so on. A printer engine 113 includes elements such as motors, actuators, solenoids, and the like, which require higher operating voltages (for example, 24 V) than the operating voltage of the controller unit 112. Accordingly, there are situations where a variety of DC voltages are required.

The main power supply switch SW1 is switched in response to an operation performed by an operator. The main power supply switch SW1 includes a first switch contact SW1a connected serially to the hot line H and a second switch contact SW1b connected serially to the neutral line N. Note that a switch contact is an example of a mechanical switch, and is a concept that should be distinguished from a semiconductor switch. The first switch contact SW1a and the second switch contact SW1b are turned on/off by the operator manually switching the main power supply switch SW1. Thus in the present embodiment, the hot line H is turned on/off using only the first switch contact SW1a. Because the second switch contact SW1b and the AC cutting circuit 104 are connected to the neutral line N in parallel, AC from the commercial AC power supply 100 can be supplied to the DC power supply 103 from either one thereof. The second switch contact SW1b is switched from a conduction state to a cut state by a switch-off signal SWoff from the controller unit 112. The conduction state may be called an on state, a power supply state, a closed state, or the like. The cut state may be called an off state, an interrupted state, an open state, or the like.

The AC cutting circuit 104 passes or cuts the AC from the commercial AC power supply 100 to the DC power supply 103 based on a AC on/off control signal ACon/off from the controller unit 112. When the operator switches the main power supply switch SW1 on, AC is supplied from the commercial AC power supply 100 to the DC power supply 103 through the second switch contact SW1b regardless of whether the AC cutting circuit 104 is on or off. The AC cutting circuit 104 can be configured of a photo triac, for example. A photo triac can be driven by the DC voltage Vcc generated by the DC power supply 103, and thus can ensure lower power consumption than an electromagnetic relay or the like.

The DC power supply 103 includes an input filter circuit 105 that functions as a line filter, a rectifying circuit 106 that rectifies and smoothes AC, and a DC voltage generating circuit 107 that functions as a constant voltage source. The input filter circuit 105 is configured of, for example, an X-capacitor Cx, a common mode choke coil L, and Y-capacitors Cy1 and Cy2. The input filter circuit 105 ensures that electrical noise produced by the image forming apparatus is not transmitted to the AC power plug 101.

A discharge resistance R is disposed in a stage prior to the input filter circuit 105. When the operator pulls the AC power plug 101 from an outlet for the commercial AC power supply 100, a charge accumulated in the X-capacitor Cx is discharged and a voltage is produced at both ends of the AC power plug 101. The discharge resistance R eliminates the charge discharged from the X-capacitor Cx, making it less likely that the operator will be shocked.

The rectifying circuit 106 includes a diode bridge D that rectifies AC and a smoothing capacitor Cs that smoothes the rectified voltage. The DC voltage generating circuit 107 converts a DC voltage output from the rectifying circuit 106 into a desired DC voltage Vcc.

The controller unit 112 controls a printer power supply cutting circuit 109 that applies or cuts the DC voltage Vcc to a printer driving circuit unit 110. The controller unit 112 outputs a printer on/off signal Pon/off to the printer power supply cutting circuit 109 in accordance with a power supply mode of the image forming apparatus, for example. A standby mode in which the image forming apparatus can form images and a power saving mode in which the image forming apparatus cannot form images can be given as power supply modes used aside from the time image forming operations are underway. The power saving mode consumes less power than the standby mode. In other words, the standby mode is treated as a normal power supply mode, compared to the power saving mode. When the image forming apparatus shifts to the power saving mode from the standby mode, the controller unit 112 outputs a low-level printer on/off signal Pon/off to the printer power supply cutting circuit 109. When the low-level printer on/off signal Pon/off is input, the printer power supply cutting circuit 109 cuts the DC voltage Vcc supplied to the printer driving circuit unit 110 from the DC power supply 103. On the other hand, when the image forming apparatus returns to the standby mode from the power saving mode, the controller unit 112 outputs a high-level printer on/off signal Pon/off to the printer power supply cutting circuit 109. When the high-level printer on/off signal Pon/off is input, the printer power supply cutting circuit 109 applies the DC voltage Vcc from the DC power supply 103 to the printer driving circuit unit 110.

The controller unit 112 controls the printer driving circuit unit 110 so that desired image forming operations are executed in accordance with image forming requests received by an external interface 140. The printer driving circuit unit 110 controls the printer engine 113 by generating and outputting an operation control signal 114 based on a control data signal 115 from the controller unit 112. The printer engine 113 includes various loads, such as an image forming unit that forms toner images, a paper feed unit, an intermediate transfer unit, a fixing unit, a cleaning unit, and the like.

In the case where, for example, the image forming apparatus is in the standby mode and an operation request has not been received from the external interface 140 for a predetermined period tb, the controller unit 112 controls the image forming apparatus to shift to the power saving mode. The predetermined period tb may be set by a user through a console unit or the like (not shown), or may be a fixed value set prior to the apparatus being shipped. Note that the controller unit 112 includes a timer 152 for counting the predetermined period tb.

As described above, in order to shift the image forming apparatus to the power saving mode, the controller unit 112 outputs the low-level printer on/off signal Pon/off to the printer power supply cutting circuit 109. Meanwhile, the controller unit 112 outputs the switch-off signal SWoff to the second switch contact SW1b. The second switch contact SW1b is switched from the power supply state to the cut state by the switch-off signal SWoff. In this manner, the second switch contact SW1b is off during the power saving mode. Accordingly, the charge accumulated in the input filter circuit 105 does not appear in the AC power plug 101 via the second switch contact SW1b even if the AC power plug 101 is removed from the outlet.

Although the present embodiment describes an example in which the controller unit 112 switches the second switch contact SW1b to the cut state when the image forming apparatus shifts to the power saving mode, the image forming apparatus may shift to the power saving mode after the second switch contact SW1b switches to the cut state. This is because the controller unit 112 continues to hold the AC on/off control signal ACon/off in the on state, and thus the AC cutting circuit 104 is held in the conduction state. In other words, the neutral line N from the commercial AC power supply 100 is connected to the DC power supply 103 through the AC cutting circuit 104. In this manner, the timing at which the second switch contact SW1b cuts may be before shifting to the power saving mode or after shifting to the power saving mode.

After shifting to the power saving mode, the controller unit 112 sets the AC cutting circuit 104 on and off every predetermined time to using the AC on/off control signal ACon/off. Through this, the power can be supplied intermittently from the commercial AC power supply 100. In other words, the power consumed by the image forming apparatus can be reduced by temporarily stopping the supply of power from the commercial AC power supply 100. In conventional configurations, stopping the supply of power from the commercial AC power supply 100 causes the controller unit 112 to be unable to operate. However, according to the present embodiment, the charge in the smoothing capacitor Cs is supplied to the controller unit 112 via the DC voltage generating circuit 107, and thus the controller unit 112 can continue to operate even if the supply of power from the commercial AC power supply 100 is stopped.

The timing at which the AC cutting circuit 104 turns on/off can be determined in advance based on the amount of power consumed by the controller unit 112 in the power saving mode and the capacity of the smoothing capacitor Cs. It is necessary to set the interval of time from the time the AC cutting circuit 104 is turned off to the time the AC cutting circuit 104 is turned on (the predetermined time ta) so as not to exceed the time for which the DC voltage Vcc can be supplied using only the power accumulated in the smoothing capacitor Cs. For example, it is assumed that the DC power supply 103 can supply the DC voltage Vcc for two minutes and 30 seconds using the power accumulated in the smoothing capacitor Cs. Furthermore, a 30-second margin is employed to compensate for individual differences in capacitors, circuits, and so on. In this case, the AC cutting circuit 104 may be set to on for a two-minute interval. The charge amount that can be accumulated in the smoothing capacitor Cs also changes depending on the input AC voltage. The on/off interval may be adjusted in accordance with the AC voltage at each destination of the image forming apparatus. The on/off interval is stored in a non-volatile storage device such as a ROM prior to the apparatus being shipped, and is read out and used by the controller unit 112. Note that the controller unit 112 counts the predetermined time ta using a timer 151.

Figure 2:
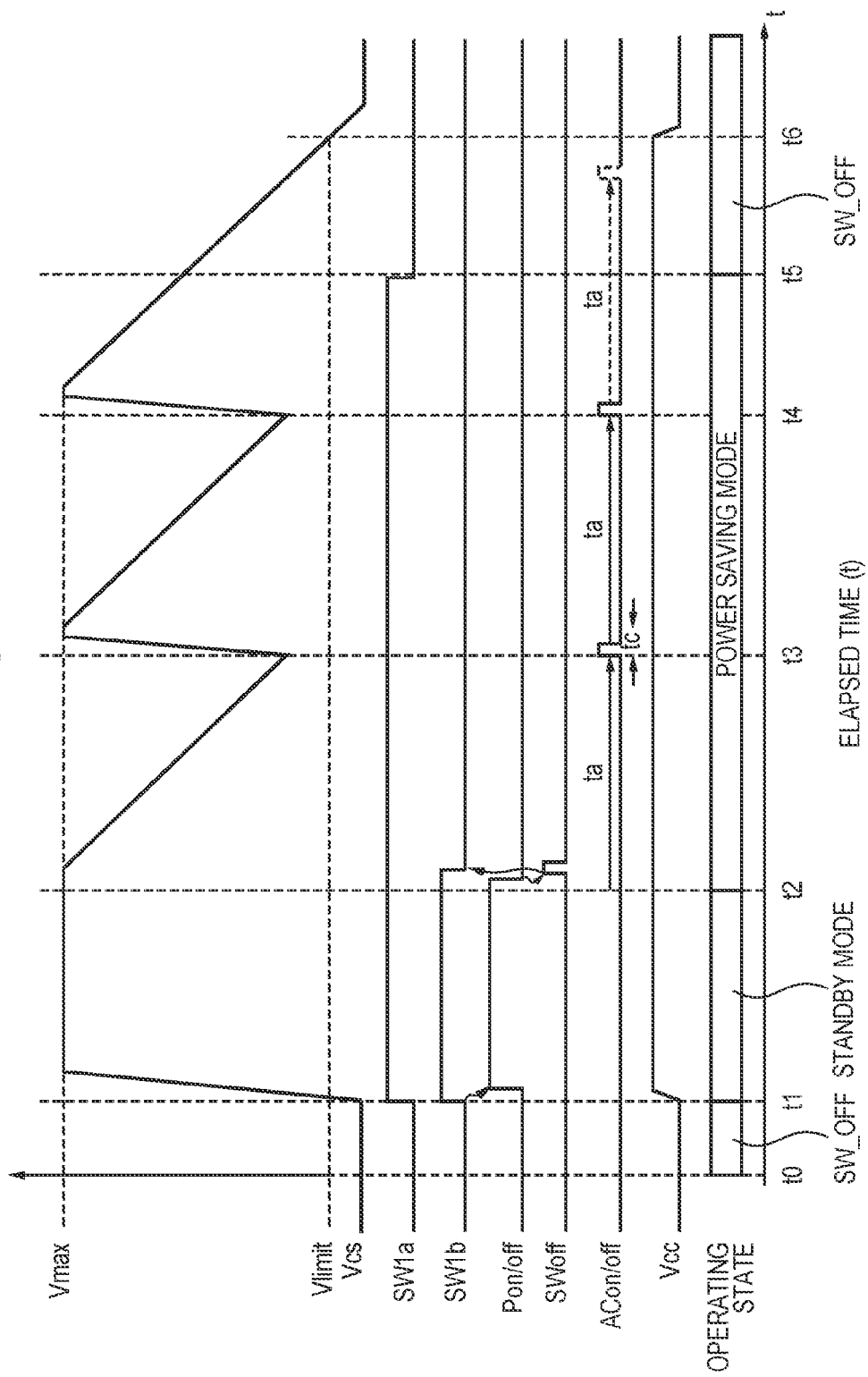
FIG. 2 is a timing chart illustrating the operational timing of control signals and the like according to the first embodiment.

Shifting to the power saving mode and operations performed in the power saving mode will be described using FIG. 2. FIG. 2 illustrates the following, in order from the top: a both-end voltage (voltage between both ends) Vcs of the smoothing capacitor Cs; a state of the first switch contact SW1a; a state of the second switch contact SW1b; the printer on/off signal Pon/off; the switch-off signal SWoff; the AC on/off control signal ACon/off; the DC voltage Vcc; and the operation state of the image forming apparatus.

At a timing t0, the main power supply switch SW1 of the image forming apparatus is off, and thus power is not supplied from the commercial AC power supply 100 to the image forming apparatus.

At a timing t1, when the operator switches the main power supply switch SW1 on, the first switch contact SW1a and the second switch contact SW1b of the main power supply switch SW1 are both electrified. Through this, the AC voltage supplied from the commercial AC power supply 100 is applied to an input of the DC power supply 103, and charging of the smoothing capacitor Cs begins. When the both-end voltage Vcs of the smoothing capacitor Cs becomes greater than or equal to a lower limit Vlimit of the operation voltage of the DC voltage generating circuit 107, the DC voltage generating circuit 107 begins to operate. When the DC voltage generating circuit 107 outputs the DC voltage Vcc, the controller unit 112 begins to operate. By outputting the printer on/off signal Pon/off, the controller unit 112 controls the printer power supply cutting circuit 109 and supplies the DC voltage Vcc to the printer driving circuit unit 110. The printer driving circuit unit 110 to which the DC voltage Vcc has been supplied starts controlling the printer engine 113. At this time, the both-end voltage Vcs at the smoothing capacitor Cs rises to a peak voltage Vmax of the commercial AC power supply 100.

At a timing t2, upon determining that the image forming apparatus has not been used for a predetermined time tb, the controller unit 112 begins shifting from the image forming mode to the power saving mode. The predetermined time tb is counted by a timer of the controller unit 112, starting at the point in time when the last image formation ended. When there is no image forming request and no operation made by the operator through the console unit from the point in time when the last image formation ended to the time the predetermined time tb has elapsed, the image forming apparatus shifts to the power saving mode. The predetermined time tb is one minute to several hours, for example, and may be set by the operator.

The controller unit 112 switches the printer on/off signal Pon/off to the low-level in order to shift the image forming apparatus to the power saving mode. The printer power supply cutting circuit 109 cuts the supply of the DC voltage Vcc to the printer driving circuit unit 110 in accordance with the printer on/off signal Pon/off. After this, the controller unit 112 switches the second switch contact SW1b off (the cut state) by outputting the switch-off signal SWoff.

At this point in time, the AC on/off control signal ACon/off is controlled to an off level (low-level). Because both the second switch contact SW1b and the AC cutting circuit 104 are cutting the power from the commercial AC power supply 100, the supply of power to the image forming apparatus from the commercial AC power supply 100 is completely cut off. In other words, the amount of commercial AC power consumed is 0 [W]. The supply of power to the DC voltage generating circuit 107 is executed by the smoothing capacitor Cs while the supply of power from the commercial AC power supply 100 is stopped. The both-end voltage Vcs at the smoothing capacitor Cs is near the maximum value Vmax due to the supply of power from the commercial AC power supply 100. As shown in FIG. 2, the voltage Vcs at the smoothing capacitor Cs gradually drops after the power has been cut by the second switch contact SW1b. At the same time as the shift to the power saving mode, the controller unit 112 starts measuring time using the timer 152 in order to output the AC on/off control signal ACon/off every predetermined time ta. As described above, the predetermined time ta measured by the timer 152 is determined based on the amount of power consumed by the controller unit 112 and the DC voltage generating circuit 107, and the amount of charge accumulated in the smoothing capacitor Cs. As shown in FIG. 2, the predetermined time ta may be set to an amount of time at which the charge does not drop below the lower limit Vlimit of the operation voltage of the DC voltage generating circuit 107. Here, the amount of time from the timing t2 to a timing t3 is taken as the predetermined time ta.

In this manner, the controller unit 112 includes the timer 152 that measures the amount of time from the time the switch is set to off. The controller unit 112 causes the timer 152 to measure the predetermined time ta, which is shorter than the amount of time from the time the switch is set to off to the timing at which the both-end voltage at the capacitor drops below the voltage Vlimit. The voltage Vlimit is a lower limit of the operation voltage of the DC voltage generating circuit 107 that supplies power to the controller unit 112. When the timer 152 finishes measuring the predetermined time ta, the controller unit 112 turns the switch on. As a result, the charging of the capacitor is resumed before the both-end voltage of the capacitor drops below the lower limit Vlimit of the operation voltage of the DC voltage generating circuit 107 that supplies power to the controller unit 112.

At the timing t3, the controller unit 112 switches the AC on/off control signal ACon/off to an on level, and switches the AC cutting circuit 104 to the conduction state. Through this, the smoothing capacitor Cs is charged so that the both-end voltage Vcs at the smoothing capacitor Cs once again reaches the maximum value Vmax. Here, the AC cutting circuit 104 may be configured of an electromagnetic relay, or may be configured of a photo triac. As described above, a photo triac is advantageous in that it does not require a large amount of power in the conduction state, as compared to an electromagnetic relay. By supplying an on-level driving signal (the AC on/off control signal ACon/off) when the sine-wave AC voltage from the commercial AC power supply 100 is 0 [V] (a zero cross point), the photo triac can hold the on state until the next zero cross point. Accordingly, the photo triac can hold the on state across a period corresponding to a zero crossing cycle (a half-cycle of the sine wave) using an on-level signal that continues for a shorter amount of time than an amount of time corresponding to the zero crossing cycle. This makes it possible to save power. Meanwhile, a driving voltage of the photo triac is the DC voltage Vcc generated by the DC voltage generating circuit 107. A further reduction in consumed power can be achieved by reducing the driving voltage of the photo triac even further.

A predetermined time tc for which the AC on/off control signal ACon/off is held at the on level is set to an amount of time at which the smoothing capacitor Cs can be sufficiently charged, until the both-end voltage Vcs reaches the maximum value Vmax. An inrush current to the smoothing capacitor Cs may increase depending on the length of the time tc. To prevent the inrush current, an inrush current preventing circuit such as a thermistor may be added to a charge path of the smoothing capacitor Cs. The predetermined time tc may also be measured by a timer, a counter, or the like provided in the controller unit 112.

When the predetermined time tc has elapsed following the timing t3, the smoothing capacitor Cs has been sufficiently charged. At this timing, the controller unit 112 resets the timer 151 for measuring the predetermined time ta and begins the measurement again. A timing at which the time measured by the timer 151 matches the predetermined time ta corresponds to a timing t4.

At the timing t4, the controller unit 112 executes the same process as the process executed at the timing t3. In other words, the controller unit 112 repeatedly executes the processes described with reference to the timing t3 until the power supply mode of the image forming apparatus shifts from the power saving mode to another mode. A main power supply switch off mode in which the main power supply switch SW1 is switched off, a standby mode, and so on can be given as examples of other modes.

In the example shown in FIG. 2, the image forming apparatus shifts to the main power supply switch off mode at a timing t5. At the timing t5, when the operator switches the main power supply switch SW1 off, the first switch contact SW1a of the main power supply switch SW1 is switched to the cut state. As a result, the supply of power to the image forming apparatus from the commercial AC power supply 100 is stopped regardless of the AC on/off control signal ACon/off. Accordingly, the both-end voltage Vcs at the smoothing capacitor Cs gradually drops. At a timing t6, when the both-end voltage Vcs drops below the lower limit Vlimit of the operation voltage of the DC voltage generating circuit 107, the output of the DC voltage Vcc from the DC voltage generating circuit 107 stops. The controller unit 112 can operate from the time the main power supply switch SW1 is switched off to the time the output of the DC voltage Vcc stops. As indicated by a broken line in FIG. 2, the timer 151 can continue to count, and the controller unit 112 can output the AC on/off control signal ACon/off as well. However, the smoothing capacitor Cs is not charged because the main power supply switch SW1 is off.

Note that a detection circuit for detecting the on/off state of the main power supply switch SW1 may be added to the image forming apparatus. Through this, the controller unit 112 may refrain from outputting the AC on/off control signal ACon/off when the main power supply switch SW1 is off and may output the AC on/off control signal ACon/off when the main power supply switch SW1 is on.

FIG. 2 illustrates operations performed when shifting from the power saving mode to the main power supply switch off mode. When shifting from the power saving mode to the image forming mode at the timing t5, the controller unit 112 may fix the AC on/off control signal ACon/off at the on level. As a result, the smoothing capacitor Cs is charged through the AC cutting circuit 104. This state is the same as a state in which the second switch contact SW1b of the main power supply switch SW1 is electrified. After this, the controller unit 112 may execute the same process as the process executed at the timing t1. In other words, the controller unit 112 switches the printer on/off signal Pon/off to the on level and puts the image forming apparatus in an operable state.

Figure 3:
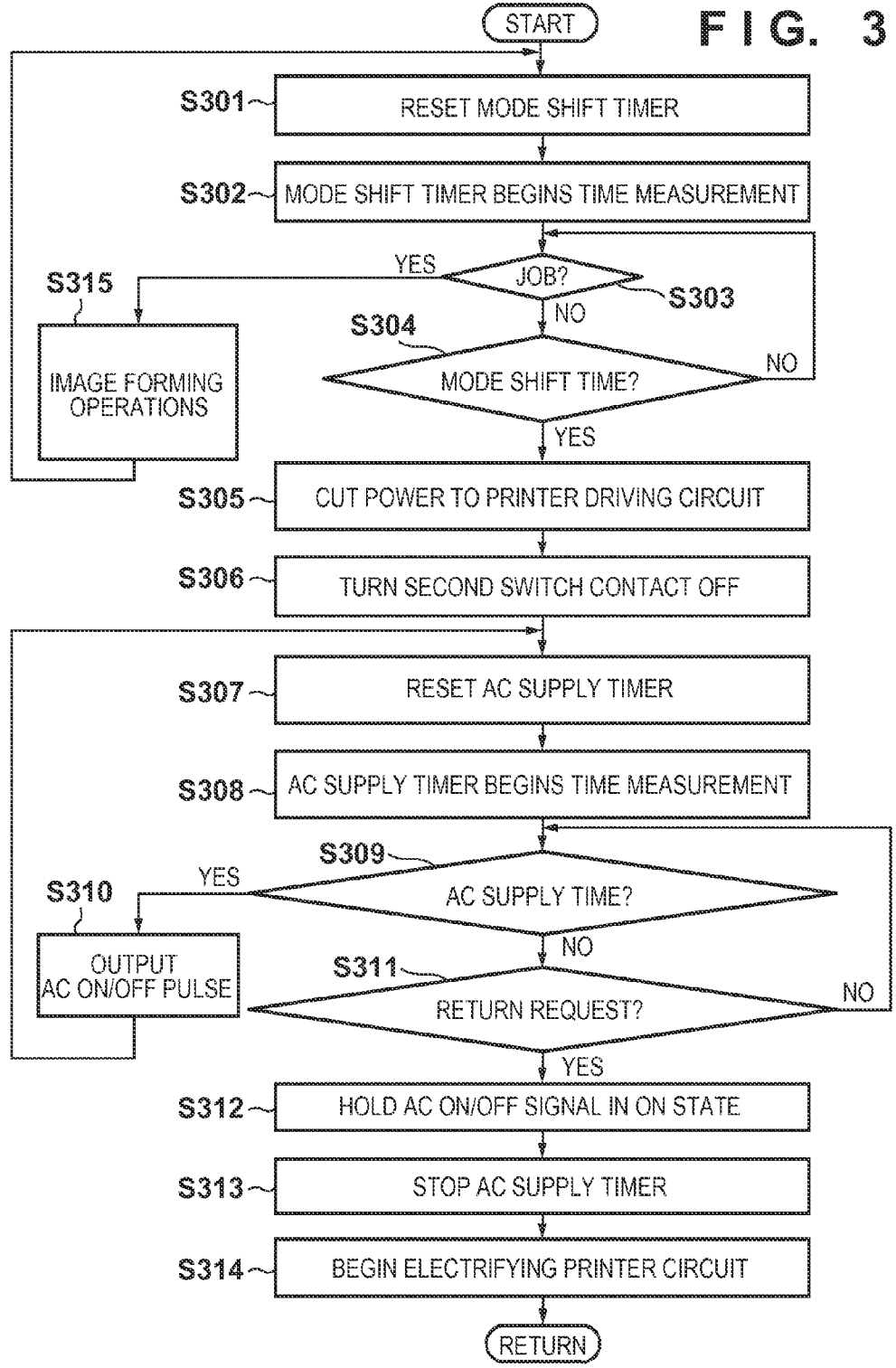
FIG. 3 is a flowchart illustrating a control method according to the first embodiment.

Control processing executed by the controller unit 112 will now be described using FIG. 3. These descriptions assume that image forming operations have ended and the image forming apparatus has shifted to the standby mode. Processes regarding shifting to the power saving mode, returning from the power saving mode, and so on are included in this control processing.

In S301, the controller unit 112 resets the numerical value of a mode shift timer (the timer 152) for determining a mode shift timing. For example, it is assumed that the operator has set a delay time to shift from the standby mode to the power saving mode (that is, the predetermined time tb) to five minutes. In this case, the timer 152 of the controller unit 112 measures five minutes. The timer 152 may be realized through a CPU that configures the controller unit 112, using a dedicated timer circuit, or the like. When the controller unit 112 completes the reset, the process advances to S302.

In S302, the controller unit 112 causes the timer 152 to begin measuring time. In S303, the controller unit 112 determines whether or not an image forming request (JOB) has been received by the external interface 140. In the case where the controller unit 112 has detected the JOB, the process advances to S315. In S315, the controller unit 112 executes image forming by controlling the printer engine 113 through the printer driving circuit unit 110. Thereafter, the controller unit 112 once again executes the processing of S301. Accordingly, the processing performed in S303 is processing performed during the standby mode. On the other hand, the process advances to S304 in the case where there is no JOB.

In S304, the controller unit 112 determines whether or not the time measured by the timer 152 has reached the predetermined time tb. In the case where the time measured by the timer 152 has not reached the predetermined time tb, the process returns to S303. On the other hand, in the case where the time measured by the timer 152 has reached the predetermined time tb, the process advances to S305.

In S305, the controller unit 112 begins shifting to the power saving mode. In other words, the controller unit 112 cuts the supply of the DC voltage Vcc to the printer driving circuit unit 110 and causes the image forming apparatus to shift to the power saving mode. To reduce the amount of power consumed to the greatest extent possible, the controller unit 112 may cut the supply of power to circuits therein that are not needed. Upon causing the image forming apparatus to shift to the power saving mode, the controller unit 112 executes operations for intermittently turning the AC input from the commercial AC power supply 100 on and off.

In S306, the controller unit 112 puts the second switch contact SW1b of the main power supply switch SW1 into an open state by outputting the switch-off signal SWoff to the second switch contact SW1b. As a result, the supply of AC voltage to the DC power supply 103 is stopped, and the amount of power consumed by the image forming apparatus drops to 0. However, the controller unit 112 continues to operate due to the power accumulated in the smoothing capacitor Cs of the rectifying circuit 106.

In S307, the controller unit 112 resets an AC supply timer (the timer 151). The timer 151 functions as a timer for measuring the amount of time from the time the switch is set to off. In S308, the controller unit 112 causes the timer 151 to begin measuring time. Like the timer 152, the timer 151 may be provided within the controller unit 112.

In S309, the controller unit 112 determines whether or not the time measured by the timer 151 has reached the predetermined time ta. When the time measured by the timer 151 reaches the predetermined time ta, the process advances to S310. In S310, the controller unit 112 outputs the pulse-shaped AC on/off control signal ACon/off, whose pulse duration corresponds to tc. As a result, the supply of power from the commercial AC power supply 100 is temporarily resumed, and the smoothing capacitor Cs is charged. After this, the process returns to step S307.

If the time measured by the timer 151 has not reached the predetermined time ta in S309, the process advances to S311.

In S311, the controller unit 112 determines whether or not a return request has been received from the external interface 140. The process returns to S309 if there is no return request. However, the process advances to S312 if there is a return request.

The supply of power to the image forming apparatus from the commercial AC power supply 100 is normally off as a result of the operations from S305 to S311. Meanwhile, the operating power supply for the controller unit 112 is realized by the power accumulated in the smoothing capacitor Cs. Accordingly, the present embodiment can achieve a reduction in the amount of power consumed, as compared to conventional techniques that do not stop the supply of power from the commercial AC power supply 100.

In addition, the controller unit 112 switches the AC cutting circuit 104 from the cut state to the power supply state before the amount of charge accumulated in the smoothing capacitor Cs is reduced (that is, before the both-end voltage Vcs drops below 50 [V], which is the lower limit Vlimit of the operation voltage of the DC voltage generating circuit 107). The smoothing capacitor Cs is recharged as a result. According to the present embodiment, the image forming apparatus can be kept in a reduced power consumption state by repeating these operations.

Note that a semiconductor switch such as a triac can be employed for the AC cutting circuit 104 in order to control the charge time of the smoothing capacitor Cs. By employing a triac, the on state can be continued for an amount of time equivalent to an AC cycle from the commercial AC power supply 100, based on the length of time a pulse-shaped trigger signal continues. A photo triac can be driven by the DC voltage Vcc, and thus is advantageous in terms of the amount of power consumed.

In S312, the controller unit 112 holds the AC on/off control signal ACon/off in the on state. As a result, power can be supplied to the DC power supply 103 through the AC cutting circuit 104 even if the second switch contact SW1b of the main power supply switch SW1 is in the cut state.

In S313, the controller unit 112 stops the timer 151. In S314, the controller unit 112 resumes electrification of the printer driving circuit unit 110, and returns the apparatus to the standby state.

As described thus far, according to the present embodiment, the supply of power from the commercial AC power supply 100 is turned on and off every predetermined time to during the power saving mode, and thus the amount of power consumed by the image forming apparatus can be reduced more than in conventional techniques. Although power is consumed by the discharge resistance R while power is being supplied from the commercial AC power supply 100, cutting the supply of power from the commercial AC power supply 100 makes it possible to reduce the amount of power consumed by the discharge resistance R more than in conventional techniques. For example, in the case where a configuration that turns the supply on for one second every two minutes is employed, the power consumed by the discharge resistance R is $\frac{1}{120}$ that of the conventional techniques, and thus the amount of power consumed can be greatly reduced. Note that "conventional technique" refers to an image forming apparatus that continually supplies power from the commercial AC power supply 100 to the discharge resistance R.

The AC cutting circuit 104 can be driven by the DC voltage Vcc if a photo triac is employed for the AC cutting circuit 104 that turns the AC from the commercial AC power supply 100 on and off. Although an electromagnetic relay may be employed for the AC cutting circuit 104, a photo triac is advantageous in terms of power consumption. A power supply located at a primary side such as the both-end voltage Vcs at the smoothing capacitor Cs may be used instead of the DC voltage Vcc. However, because the DC voltage Vcc is lower than the both-end voltage Vcs, using the DC voltage Vcc is advantageous in terms of suppressing the amount of power consumed by the AC cutting circuit 104.

In FIG. 1, the second switch contact SW1b, which can be controlled by the controller unit 112 to pass/cut power, is connected in parallel to the AC cutting circuit 104. However, the present invention is not limited to this configuration, and any main power supply switch having the same functionality as the main power supply switch SW1 can be employed. Other examples of main power supply switches SW will be described further in second and third embodiments.

Although the AC cutting circuit 104 is inserted in the neutral line N in the present embodiment, the AC cutting circuit 104 may be inserted in the hot line H. The same applies in the other embodiments as well.

Second Embodiment

Figure 4:
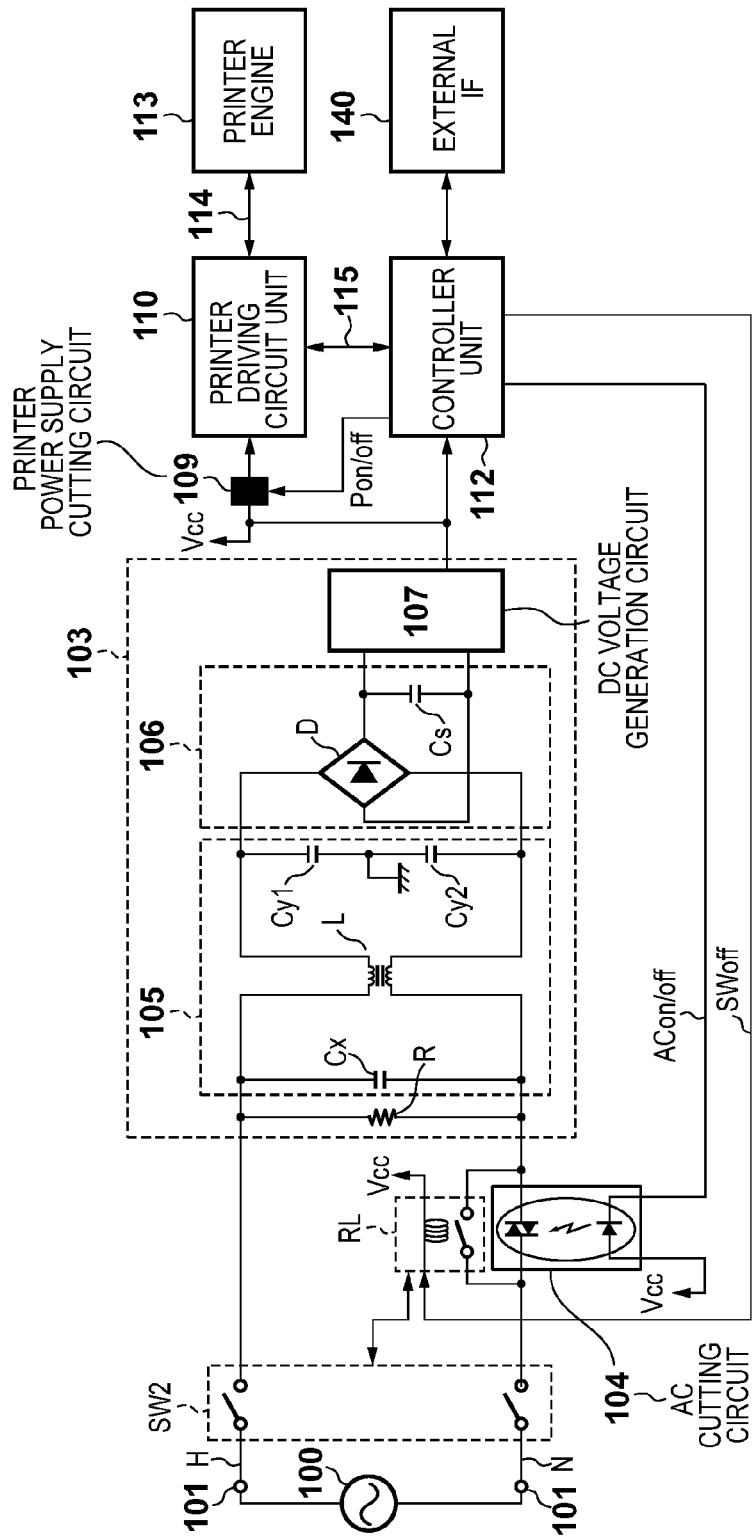
FIG. 4 is a block diagram illustrating a power supply apparatus and part of an image forming apparatus according to a second embodiment.

A second embodiment will be described using FIG. 4. In the present embodiment, the aforementioned second switch contact SW1b is configured of a single switch contact of a main power supply switch SW2, and an AC cutting relay RL. In the present embodiment, of the two contacts in the main power supply switch SW2, the AC cutting circuit 104 is connected serially to the contact that is itself connected serially to the neutral line N. The AC cutting circuit 104 is connected in parallel to the AC cutting relay RL. In other words, the AC cutting relay RL is connected serially to the contact that is itself connected serially to the neutral line N. The AC cutting relay RL is switched on through mechanically linked operations when the operator switches the main power supply switch SW2 on. Meanwhile, the AC cutting relay RL is switched off when the switch-off signal SWoff is supplied. As a result, the second embodiment operates in the same manner as the first embodiment. Accordingly, the timing chart, flowchart, and effects of the second embodiment are the same as those in the first embodiment, and thus descriptions thereof will be omitted here.

Third Embodiment

A third embodiment will be described using FIG. 5. In the third embodiment, the second switch contact SW1b described in the first embodiment is configured of a second switch contact SW3b and a bistable relay (latching relay) RLb. A further feature of the present embodiment is that a circuit element that detects whether a main power supply switch SW3 is on or off is provided, so that the bistable relay RLb is turned on with certainty when the main power supply switch SW3 is off.

Figure 5:
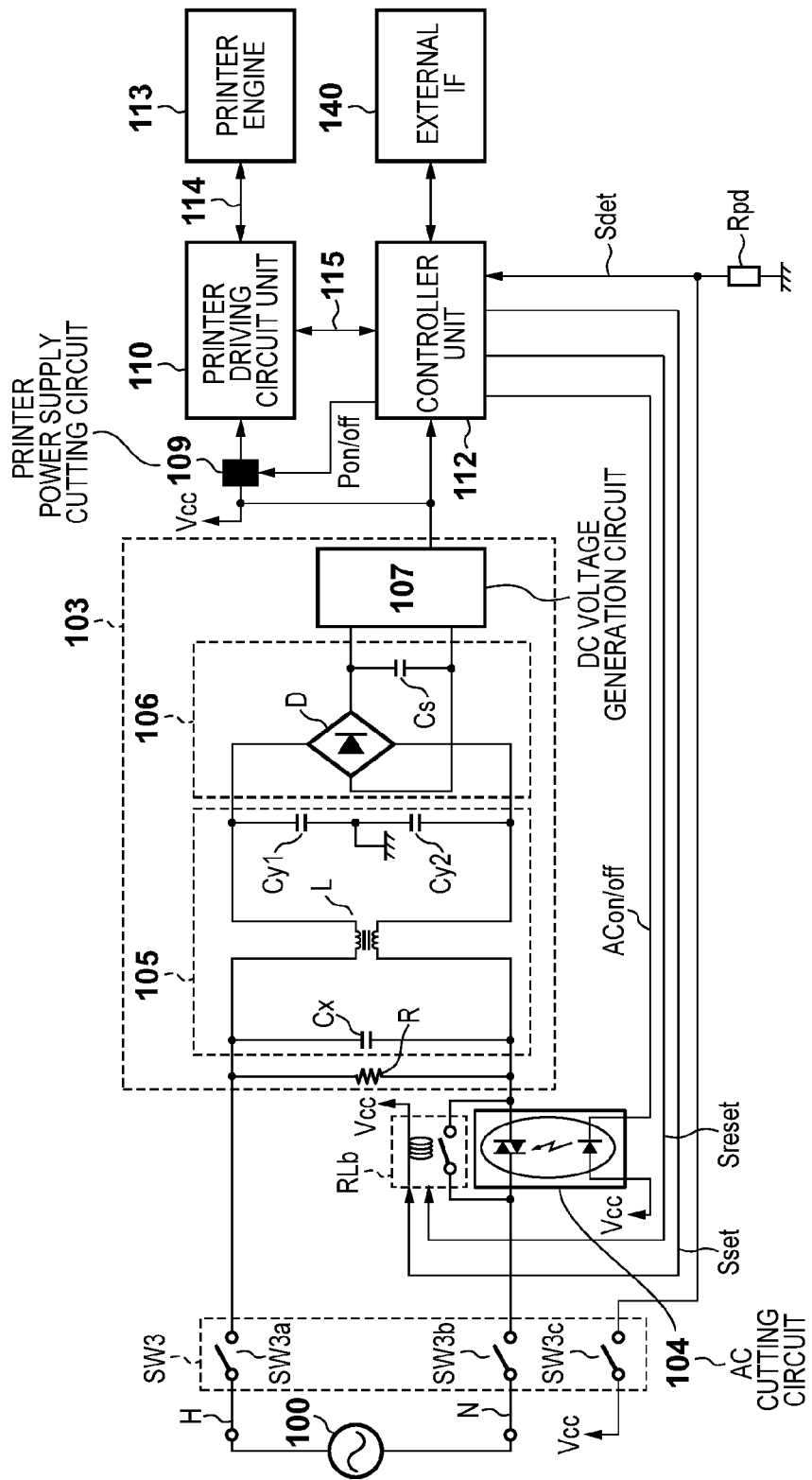
FIG. 5 is a block diagram illustrating a power supply apparatus and part of an image forming apparatus according to a third embodiment.

As shown in FIG. 5, the main power supply switch SW3 includes three contacts. A first switch contact SW3a and the second switch contact SW3b are contacts that cut the hot line H and the neutral line N, which are power supply lines from the commercial AC power supply 100. The first switch contact SW3a is connected serially to the hot line H. The second switch contact SW3b is connected serially to the neutral line N. The second switch contact SW3b is also connected serially to the AC cutting circuit 104.

A third switch contact SW3c is a contact that detects that the main power supply switch SW3 has been turned off by the operator. In other words, the third switch contact SW3c is a circuit element that detects the state of the main power supply switch SW3. The first switch contact SW3a, the second switch contact SW3b, and the third switch contact SW3c operate under a mechanical link. That is, if the main power supply switch SW3 is in an on state, the third switch contact SW3c closes. Accordingly, the DC voltage Vcc is applied to a port of the controller unit 112 via the third switch contact SW3c. On the other hand, if the main power supply switch SW3 is in an off state, the third switch contact SW3c opens, and thus the DC voltage Vcc is not applied to the port of the controller unit 112. One end of the third switch contact SW3c is connected to the DC voltage Vcc, and the other end is connected to the port of the controller unit 112 and one end of a pull-down resistance Rpd. The other end of the pull-down resistance Rpd is grounded. Accordingly, when the main power supply switch SW3 enters the off state, the port goes to a low-level. Note that a signal input to the port will be called a main power supply switch detection signal Sdet. In this manner, the main power supply switch detection signal Sdet goes to a low-level when the main power supply switch SW3 enters the off state, and goes to a high-level when the main power supply switch SW3 enters the on state.

The bistable relay RLb is connected in parallel to the AC cutting circuit 104. Note that the bistable relay RLb is serially connected to the second switch contact SW3b. The bistable relay RLb is a relay that does not require power to hold two states, namely the on state and the off state. The core, yoke, and armature of the bistable relay RLb are configured of a semi-hard magnetic material, and two operating coils are provided. A semi-hard magnetic material retains magnetic fluxes, and thus if a contact is turned on by one of the operating coils, that state is held by the retained magnetic flux. Meanwhile, the bistable relay RLb can set the contact to off using the other operating coil. The bistable relay RLb is electrified by a set signal Sset output by the controller unit 112 and cut by a reset signal Sreset output by the controller unit 112. The DC voltage Vcc is used as a power supply for driving the operating coils of the bistable relay RLb.

When the operator turns the main power supply switch SW3 on, it is absolutely necessary for AC from the commercial AC power supply 100 to be supplied to the DC power supply 103. For example, when the bistable relay RLb is off, AC is not supplied to the DC power supply 103 from the commercial AC power supply 100 even if the main power supply switch SW3 is turned on. Accordingly, upon detecting that the main power supply switch SW3 has been turned off, the controller unit 112 outputs the set signal Sset and switches the bistable relay RLb to the conduction state without exception.

Operations performed in the third embodiment will be described using the timing chart in FIG. 6. At a timing t0, the operating state of the image forming apparatus is a switch-off state. In this state, the contact of the bistable relay RLb is kept on in a stable manner. The image forming apparatus is shipped with the contact of the bistable relay RLb set to on. After shipment, the contact of the bistable relay RLb is kept in the on state in a stable manner in response to the main power supply switch SW3 being turned off.

At a timing t1, the main power supply switch SW3 is switched on by the operator. Through this, AC is supplied from the commercial AC power supply 100 to the DC power supply 103 via the first switch contact SW3a, the second switch contact SW3b, and the bistable relay RLb, and the charging of the smoothing capacitor Cs begins. When the both-end voltage Vcs of the smoothing capacitor Cs exceeds the lower limit Vlimit of the operation voltage of the DC voltage generating circuit 107, the DC voltage generating circuit 107 begins to output the DC voltage Vcc. Through this, the controller unit 112 begins to operate. In addition, because the third switch contact SW3c is electrified and the DC voltage Vcc is output from the DC voltage generating circuit 107, the main power supply switch detection signal Sdet goes to high-level. By outputting the printer on/off signal Pon/off, the controller unit 112 switches the printer power supply cutting circuit 109 on and supplies the DC voltage Vcc to the printer driving circuit unit 110. Through this, the printer engine 113 begins to operate. At this time, the both-end voltage Vcs at the smoothing capacitor Cs rises to Vmax, which is the peak voltage of the commercial AC power supply 100.

At a timing t2, the controller unit 112 determines that the image forming apparatus has not been used throughout the predetermined time tb, and shifts to the power saving mode through the same operations as described in the first embodiment. Note that in the third embodiment, the controller unit 112 outputs a relay reset signal Rreset and shifts the bistable relay RLb to the off state. Through this, in the third embodiment, a state equivalent to the state in which the second switch contact SW1b is cut in the first embodiment can be created.

At timings t3 and t4, the amount of power consumed in the power saving mode can be reduced more than in conventional techniques, by repeating the same processing as in the first embodiment.

At a timing t5, when the main power supply switch SW3 is turned off by the operator, the third switch contact SW3c is cut. As a result, the main power supply switch detection signal Sdet instantly goes to the low-level, and thus the controller unit 112 recognizes that the main power supply switch SW3 has been turned off. Having recognized that the main power supply switch SW3 has been turned off, the controller unit 112 shifts the bistable relay RLb to the on state by outputting the relay set signal Sset.

It is necessary for this shifting process to be performed before the output of the DC voltage Vcc stops, and thus the controller unit 112 continually monitors the main power supply switch detection signal Sdet. In addition, treating the shifting process as a high-priority process such as an interrupt makes it possible to shift the bistable relay RLb to the on state with even more certainty.

Figure 6:
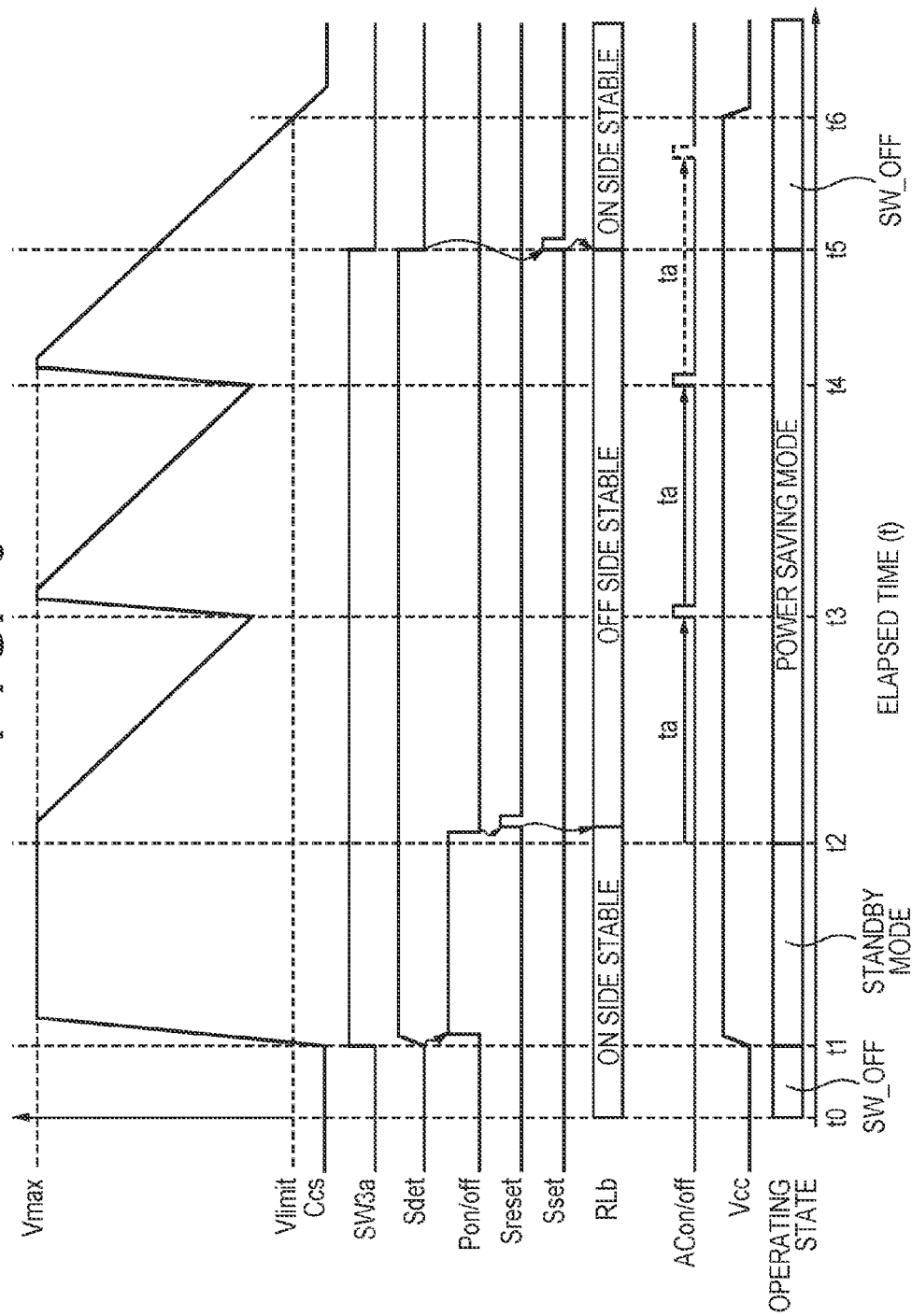
FIG. 6 is a timing chart illustrating the operational timing of control signals and the like according to the third embodiment.

As shown in FIG. 6, the both-end voltage Vcs at the smoothing capacitor Cs in the power saving mode repeatedly rises and falls in response to the driving timing of the AC on/off control signal ACon/off. Accordingly, it is necessary to set the predetermined time ta so that the bistable relay RLb can be driven with certainty, even if the both-end voltage Vcs at the smoothing capacitor Cs is at a minimum value. Note that the minimum value of the both-end voltage Vcs refers to the both-end voltage Vcs when the count value of the timer matches the predetermined time ta, as shown in FIG. 6. The predetermined time ta is set by incorporating the power required to set the bistable relay RLb to the lower limit Vlimit of the operation voltage of the DC voltage generating circuit 107.

Through the above operations, the bistable relay RLb is kept in a stable on state with certainty when the main power supply switch SW3 is turned off. The control thereafter is the same as in the first embodiment.

Figure 7:
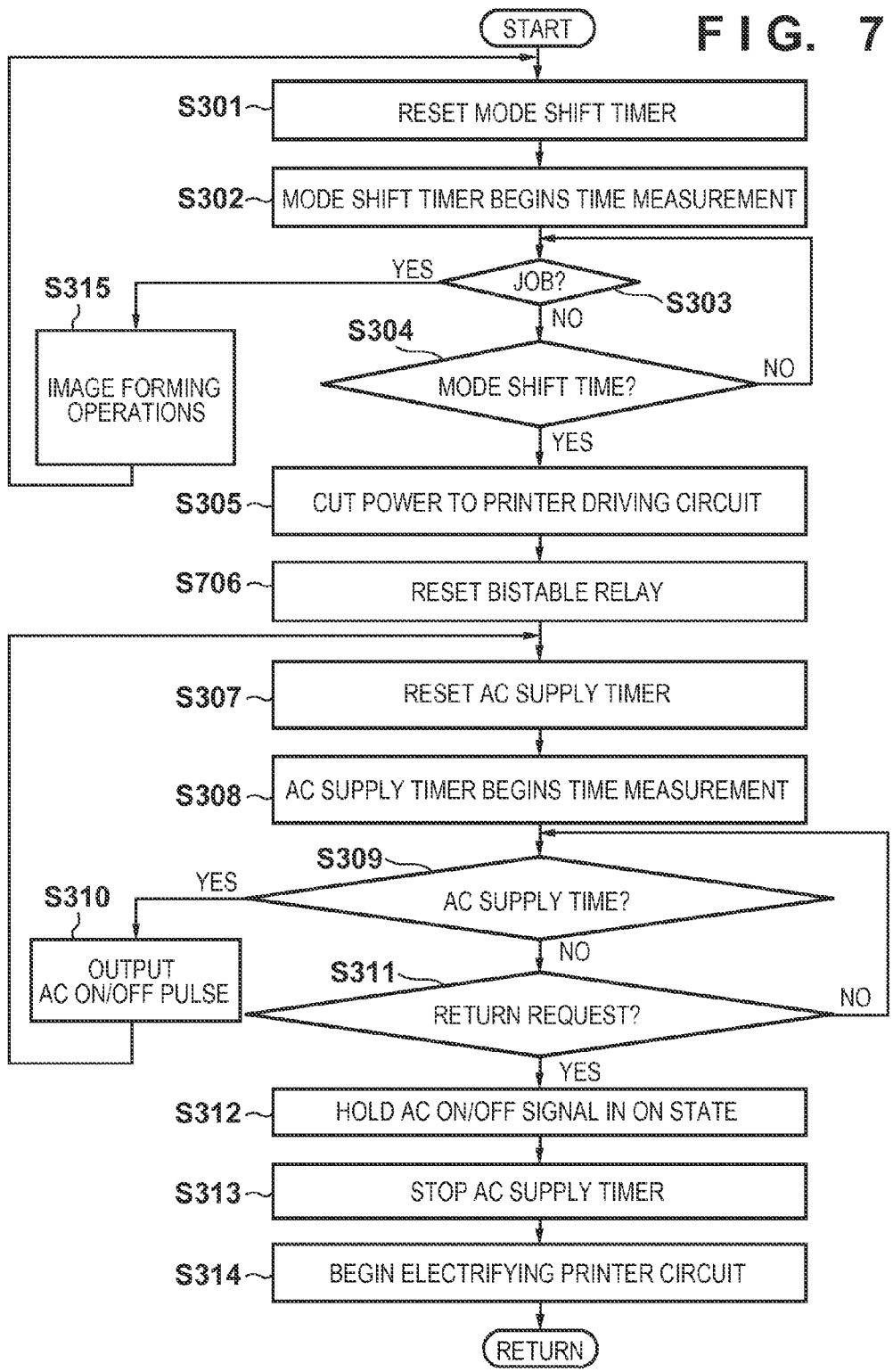
FIG. 7 is a flowchart illustrating a control method according to the third embodiment.
Figure 8:
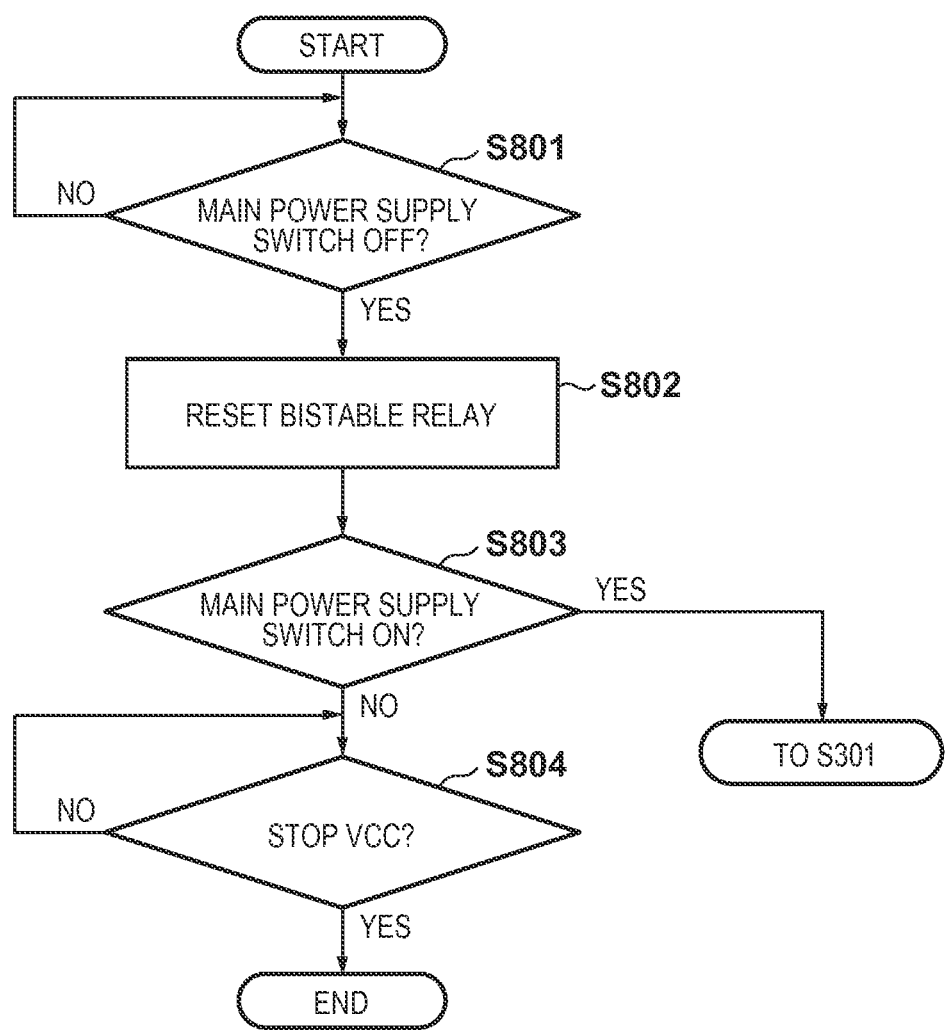
FIG. 8 is a flowchart illustrating a bistable relay control method performed when a main power supply switch is off, according to the third embodiment.

FIGS. 7 and 8 illustrate operations performed in the third embodiment. FIG. 7 illustrates a main sequence of the third embodiment. In FIG. 7, steps that are the same as in FIG. 3 are given the same reference numerals in order to simplify the descriptions. Comparing FIGS. 7 and 3, it can be seen that S306 has been replaced with S706. When a condition for shifting to the power saving mode has been met, the controller unit 112 executes S706.

In S706, the controller unit 112 switches the contact of the bistable relay RLb off (cut) by outputting the bistable relay reset signal Rreset. In this manner, in the third embodiment, the same effect as in the first embodiment is achieved by switching the contact of the bistable relay RLb off instead of switching the second switch contact SW3b off. The process then advances to S307.

FIG. 8 illustrates a sub sequence of the third embodiment. This sub sequence is executed by the controller unit 112 in parallel with the main sequence illustrated in FIG. 7. As described above, the controller unit 112 is continually monitoring the main power supply switch detection signal Sdet.

In S801, the controller unit 112 determines whether or not the main power supply switch detection signal Sdet has gone from high-level to low-level (that is, if the main power supply switch SW3 has turned off). When the main power supply switch detection signal Sdet goes from high-level to low-level, the process advances to S802.

In S802, the controller unit 112 outputs the relay set signal Sset for setting the bistable relay RLb on, with priority over all steps in FIG. 7.

In S803, the controller unit 112 determines whether or not the main power supply switch detection signal Sdet has gone from low-level to high-level. In other words, the controller unit 112 determines whether or not the main power supply switch SW3 has once again been switched on. That is, the process advances to S301 shown in FIG. 7 when the main power supply switch SW3 has been turned on. On the other hand, the process advances to S804 when the main power supply switch SW3 remains off. S804 is not a step executed by the controller unit 112, but is described here in order to facilitate understanding of the overall process.

When the main power supply switch SW3 turns off, the DC voltage Vcc is output based on the charge of the smoothing capacitor Cs. Accordingly, as the accumulated charge in the smoothing capacitor Cs drops, the both-end voltage Vcs also drops. In S804, when the both-end voltage Vcs drops below Vlimit, the DC voltage generating circuit 107 can no longer output the DC voltage Vcc. The controller unit 112 also stops operating as a result. Meanwhile, the controller unit 112 repeatedly executes the process of S803 while the DC voltage Vcc is being applied. For example, the process can advance to S301 when the main power supply switch SW3 is turned off for an instant.

As described above, the same effects as those described in the first embodiment can also be achieved with the configuration described in the third embodiment. In particular, when the bistable relay RLb is employed as a switch for cutting a power supply line, it is necessary for the bistable relay RLb to stabilize in the on state when the main power supply switch SW3 is turned off. Accordingly, in the present embodiment, a circuit element that detects when the main power supply switch SW3 is turned off is provided, and thus the bistable relay RLb can be switched on with certainty when the main power supply switch SW3 has been turned off. Through this, when the main power supply switch SW3 is turned on after the main power supply switch SW3 has been turned off, the power supply line is electrified by the bistable relay RLb, which makes it possible to start up the DC power supply 103.

Image Forming Apparatus

Figure 9:
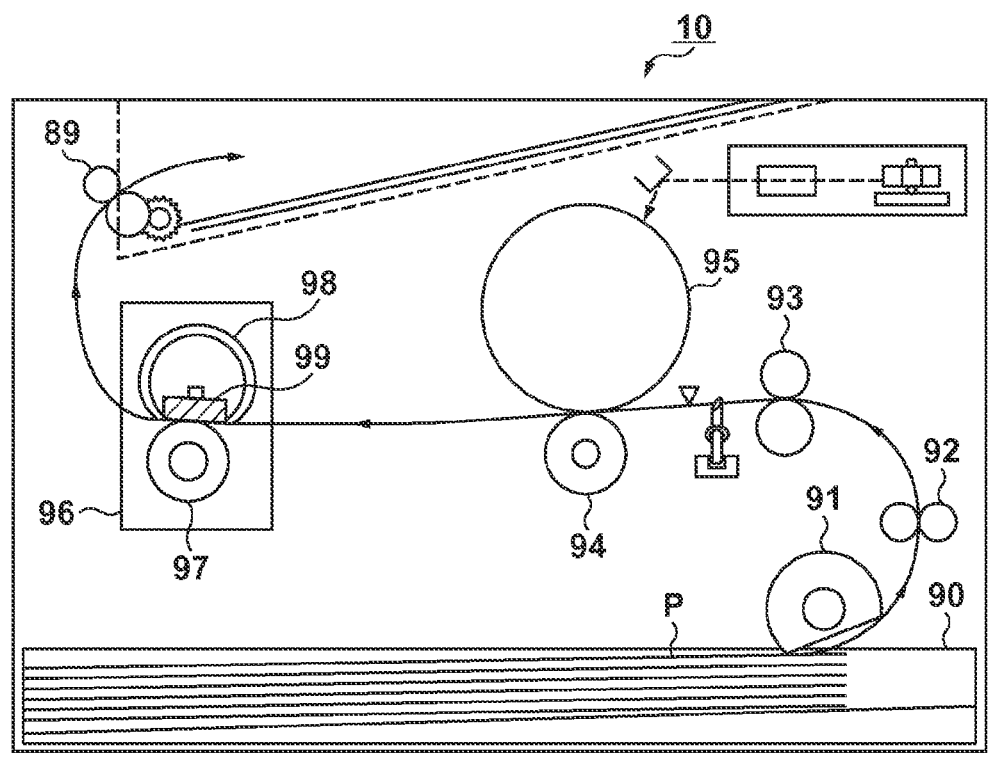
FIG. 9 is an overall cross-sectional view of an image forming apparatus.

FIG. 9 is a diagram illustrating an overall cross-sectional view of an image forming apparatus 10 according to an embodiment. A paper feed cassette 90 holds multiple pieces of a recording medium P. The recording medium P may also be called paper, sheets, transfer material, and so on. A paper feed roller 91, driven by a paper feed solenoid that is part of the printer engine 113, separates the recording medium P stacked in the paper feed cassette 90 one sheet at a time and feeds each sheet to a conveyance roller 92. The conveyance roller 92 conveys the recording medium P further downstream. The conveyance roller 92 is driven by a motor that is part of the printer engine 113.

A resist roller 93 is a type of conveyance roller that conveys the recording medium P. In particular, the resist roller 93 is used to adjust the timing at which a leading end of the recording medium P is conveyed to the image forming unit (configured of a transfer roller 94 and a photosensitive drum 95). The resist roller 93 is driven by a motor that is part of the printer engine 113.

The recording medium P, onto which has been transferred a developer (for example, toner) image by the image forming unit, is then conveyed to a fixing unit 96. The fixing unit 96 includes a pressure roller 97, a fixing film 98, and a ceramic heater 99, for fixing the toner on the recording medium P. After undergoing the pressurized fixing, the recording medium P is discharged to the exterior of the device by a discharge roller 89. The pressure roller 97 and the discharge roller 89 are driven by a motor that is part of the printer engine 113.

A power supply apparatus of the image forming apparatus 10 is controlled as described in the first embodiment to the third embodiment, and thus the overall power consumption of the image forming apparatus 10 can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-002839, filed Jan. 10, 2013 which is hereby incorporated by reference herein in its entirety.

What is claimed is:

1. Electric equipment having a normal power supply mode and a power saving mode that consumes less power than the normal power supply mode, the equipment comprising:
   a first power supply line and a second power supply line connected to an AC power supply, to which AC current is input from the AC power supply;
   a line filter connected between the first power supply line and the second power supply line;
   a discharge resistance connected in parallel to the line filter and configured to discharge a charge accumulated in the line filter when the supply of the AC current is cut;
   a first switch inserted in the first power supply line at a preceding stage of the line filter and the discharge resistance;
   a second switch inserted in the second power supply line at a preceding stage of the line filter and the discharge resistance;
   a third switch inserted in the second power supply line at a preceding stage of the line filter and the discharge resistance and connected in parallel to the second switch;
   a rectifying and smoothing circuit provided at a subsequent stage of the line filter and the discharge resistance and configured to rectify the AC current and smoothes the AC current using a capacitor;
   a DC voltage generating circuit, connected to the rectifying and smoothing circuit, configured to generate a DC voltage; and
   a controller, operating under the DC voltage generated by the DC voltage generating circuit, configured to turn at least one of the first switch and the second switch off when the electric equipment shifts to the power saving mode, and then charge the capacitor by turning the third switch on every predetermined amount of time or before a both-end voltage at the capacitor drops below a lower limit of operation voltage, wherein the lower limit of operation voltage is a lower limit of operation voltage of the DC voltage generating circuit.

2. The electric equipment according to claim 1,
   wherein the DC voltage generating circuit is further configured to generate the DC voltage based on a charge of the capacitor after the supply of the AC current is turned off by the first switch, the second switch and the third switch.

3. The electric equipment according to claim 1,
   wherein the predetermined amount of time is set in accordance with an AC voltage input to the electric equipment.

4. The electric equipment according to claim 1,
   wherein the third switch includes a photo triac.

5. The electric equipment according to claim 4,
   wherein the first switch and the second switch forms an electromagnetic relay.

6. An image forming apparatus having a normal power supply mode and a power saving mode that consumes less power than the normal power supply mode, the apparatus comprising:
   a first power supply line and a second power supply line connected to an AC power supply, through which AC current is input from the AC power supply;
   a line filter connected between the first power supply line and the second power supply line;
   a discharge resistance connected in parallel to the line filter and configured to discharge a charge accumulated in the line filter when the supply of the AC current is cut;
   a first switch inserted in the first power supply line at a preceding stage of the line filter and the discharge resistance;
   a second switch inserted in the second power supply line at a preceding stage of the line filter and the discharge resistance;
   a third switch inserted in the second power supply line at a preceding stage of the line filter and the discharge resistance and connected in parallel to the second switch;
   a rectifying and smoothing circuit provided at a subsequent stage of the line filter and the discharge resistance and configured to rectify the AC current and smoothes the AC current using a capacitor;
   a DC voltage generating circuit, connected to the rectifying and smoothing circuit, configured to generate a DC voltage; and
   a controller, operating under the DC voltage generated by the DC voltage generating circuit, configured to turn at least one of the first switch and the second switch off when the image forming apparatus shifts to the power saving mode, and then charge the capacitor by turning the third switch on every predetermined amount of time or before a both-end voltage at the capacitor drops below a lower limit of operation voltage, wherein the lower limit of operation voltage is a lower limit of operation voltage of the DC voltage generating circuit.

7. The image forming apparatus according to claim 6, further comprising:
   a timer configured to measure an amount of time from a time the third switch is turned off,
   wherein the timer is caused to measure a predetermined amount of time that is shorter than an amount of time from a time when the third switch is turned off until a time when a time at which the both-end voltage at the capacitor drops below a lower limit of operation voltage of the controller, and charging of the capacitor is caused to resume before the both-end voltage at the capacitor drops below the lower limit of operation voltage of the controller by turning the third switch on when the timer finishes measuring the predetermined amount of time.

8. The image forming apparatus according to claim 6, wherein the third switch is a photo triac.

9. The image forming apparatus according to claim 6, further comprising:
a fourth switch inserted in the second power supply line at a preceding stage of the second switch and the third switch, and configured to work with the second switch,
wherein the second switch is a bistable relay, and
wherein the bistable relay is switched off by the controller when the image forming apparatus shifts to the power saving mode and is switched on by the controller when the first switch and the fourth switch are switched off.

* * * * *